United States Patent
Kalyur

(10) Patent No.: US 6,366,994 B1
(45) Date of Patent: Apr. 2, 2002

(54) CACHE AWARE MEMORY ALLOCATION

(75) Inventor: Sesha Kalyur, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/337,932

(22) Filed: Jun. 22, 1999

(51) Int. Cl.[7] .............................................. G06F 12/10
(52) U.S. Cl. ...................... 711/173; 711/129; 711/153; 711/159; 711/173; 711/202
(58) Field of Search ................................ 711/147, 151, 711/152, 148, 150, 118, 129, 130, 202, 205, 206, 207, 173, 153, 119

(56) References Cited

U.S. PATENT DOCUMENTS

| | | | |
|---|---|---|---|
| 4,701,844 A | * | 10/1987 | Thompson et al. ......... 711/119 |
| 5,261,088 A | | 11/1993 | Baird et al. |
| 5,442,571 A | * | 8/1995 | Sites ..................... 395/500.47 |
| 5,561,786 A | | 10/1996 | Morse |
| 5,623,654 A | | 4/1997 | Peterman |
| 5,630,097 A | * | 5/1997 | Orbits et al. ................. 711/165 |
| 5,787,447 A | | 7/1998 | Smithline et al. |
| 5,897,660 A | * | 4/1999 | Reinders et al. ............ 711/170 |
| 6,026,475 A | * | 2/2000 | Woodman .................... 711/202 |
| 6,243,794 B1 | * | 6/2001 | Casamatta ................... 711/153 |

OTHER PUBLICATIONS

Kernighan et al., *The C Programming Language*, Bell Telephone Laboratories, 1978, pp. 96–99 and pp. 173–177.

* cited by examiner

*Primary Examiner*—Matthew Kim
*Assistant Examiner*—B. R. Peugh
(74) *Attorney, Agent, or Firm*—Conley, Rose & Tayon, PC; B Noël Kivlin

(57) ABSTRACT

An apparatus and method for allocating a memory in a cache aware manner are provided. An operating system can be configured to partition a system memory into regions. The operating system can then allocate corresponding portions within each region to various programs that include the operating system and applications. The portions within each region of the system memory can map into designated portions of a cache. The size of a portion of memory allocated for a program can be determined according to the needs of the program.

23 Claims, 7 Drawing Sheets

CACHE AWARE MEMORY ALLOCATION

BACKGROUND OF THE INVENTION

1. Field of the Invention

The present invention relates to allocating memory in a computer system, and more particularly, to a methodology of allocating memory to increase the availability of frequently accessed pages in a cache of the computer system.

2. Description of the Related Art

Modern multiuser/multitasking computer systems run complex operating systems to accomplish concurrent execution of a myriad of user applications. Broadly speaking, an operating system may be defined as system software that schedules tasks for execution by one or more processing units in a computer system, allocates storage among various application programs, handles a system interface to the peripheral hardware, and presents a default interface to the user when no application program is running. Operating systems may also perform other functions. Some examples of operating systems include Sun Microsystems' SOLARIS operating system, AT&T's UNIX operating system, IBM's OS/2 operating system, Microsoft's WINDOWS and MS-DOS family of operating systems, Apple's MACINTOSH operating system, Novell's NETWARE operating system, and Digital Equipment Corporation's VMS operating system.

An operating system is generally responsible for allocating memory from a system memory to itself as well as applications to be executed by a computer system. A prior art system memory allocation scheme in a computer system is illustrated in FIG. 1. As shown in FIG. 1, the operating system typically allocates a portion of system memory 100 to itself, shown as operating system 110, and a portion of system memory 100 to applications, shown as applications 120. An application program may be defined as a program that performs a specific function directly for the user. Word processing and spreadsheet software are common examples of application programs. The remainder of system memory 100 is shown as unallocated memory 130. The unallocated memory 130 can be allocated by the operating system as the need arises. System memory 100 may be visualized as being divided into a number of memory blocks or pages. The operating system 110 and the applications 120 may require one or more memory pages depending on, among other things, the page size and the number of applications currently being executed.

During the execution of a program, such as an operating system or an application, a copy of a memory block or page allocated to the program may be loaded into a cache. As used herein, the term page can be defined to include a block of memory of any size that is store in a cache. FIG. 1, for example, indicates cache 105 storing memory page 150a at cache location 160. Pages are typically mapped into designated cache locations according to their addresses. As shown in FIG. 1, for example, memory pages 150a, 150b, 150c, and 150d all map to cache location 160.

Unfortunately, mapping multiple pages to a particular cache location often results in cache collisions. Cache collisions occur when one memory page replaces another memory page in a cache. In order to access the memory page that was originally in the cache, a system must re-access the memory page from system memory. Consequently, cache collisions can adversely affect system performance as additional time is generally needed to retrieve memory pages from system memory. As shown in FIG. 1, a cache collision can occur when the system accesses memory page 150b or 150c or when the system allocates memory page 150d. The system may attempt to store memory page 150b, 150c, or 150d into cache location 160.

Cache collisions can occur with greater frequency when portions of memory allocated to different programs map to the same cache location. In FIG. 1, for example, collisions can occur between pages from the operating system 110 and applications 120 since memory pages 150a, 150b, 150c, or 150d map to the same cache location 160. Thus, if an application that includes memory page 150b, 150c or 150d is executed, memory page 150b, 150c, or 150d would displace the operating system memory page 150a in cache 105. Consequently, when the portion of the operating system that included memory page 150a is subsequently executed, memory page 150a would need to be accessed from system memory 100 instead of cache 105.

Caches generally work more efficiently when frequently accessed pages are present in the cache for longer periods of time than infrequently accessed pages. However, when a memory page from one type of program displaces a memory page from another type of program, it can be difficult to maintain frequently accessed pages in the cache. Therefore, a method of increasing the availability of frequently accessed pages in a cache is needed.

SUMMARY OF THE INVENTION

The problems outlined above are in large part solved by an apparatus and method as described herein. Generally speaking, an apparatus and method for allocating a memory in a cache aware manner are provided. An operating system can be configured to partition a system memory into regions. The operating system can then allocate corresponding portions within each region to various programs that include the operating system and applications. The portions within each region of the system memory can map into designated portions of a cache. The size of a portion of memory allocated for a program can be determined according to the needs of the program.

The use of the apparatus and method for allocating a memory in a cache aware manner may provide performance advantages over other memory allocation methods. First, cache collisions between the operating system and applications can be reduced. Next, cache collisions between different applications can be reduced. Also, frequently accessed routines can be locked into the cache to insure a cache hit. Further, a system memory can be allocated in an efficient manner by tuning the size of memory allocated to a particular program. Still further, the system memory can be dynamically re-allocated to efficiently accommodate new programs and changing memory needs.

Broadly speaking, a computer system is contemplated. The computer system includes a processing unit, a system memory, a cache memory, and an operating system to manage execution of a plurality of applications using the processing unit, the system memory, and the cache memory. The operating system is configured to allocate a first portion of the system memory to a first program and a second portion of the system memory to the first program. The first portion of the system memory begins at a first address and the second portion of the system memory begins at a second address. A first portion of the first address equals a first portion of the second address.

Another computer system is also contemplated. The computer system includes a processing unit, a system memory, a cache memory, and an operating system to manage execution of a plurality of applications using the processing unit, the system memory, and the cache memory. The operating system is configured to partition the system memory into a plurality of regions. The operating system is configured to allocate a first portion of each of the plurality of regions to a first program. The operating system is configured to allocate a second portion of each of the plurality of regions to a second program. The first portion of each of the plurality of regions maps to a first portion of the cache memory. The second portion of each of the plurality of regions maps to second portion of the cache memory.

Next, a method is contemplated. The method includes partitioning a system memory into a plurality of regions, allocating a first portion of each of the plurality of regions to a first program, and allocating a second portion of each of the plurality of regions to a second program. The first portion of each of the plurality of regions maps to a first portion of a cache memory and the second portion of each of the plurality of regions maps to second portion of the cache memory.

Another method is also contemplated. The method includes allocating a first portion of said system memory to a first program and allocating a second portion of said system memory to said first program. The first portion of the system memory begins at a first address and the second portion of the system memory begins at a second address. A first portion of the first address equals a first portion of the second address.

BRIEF DESCRIPTION OF THE DRAWINGS

Other objects and advantages of the invention will become apparent upon reading the following detailed description and upon reference to the accompanying drawings in which.

Figure 1:
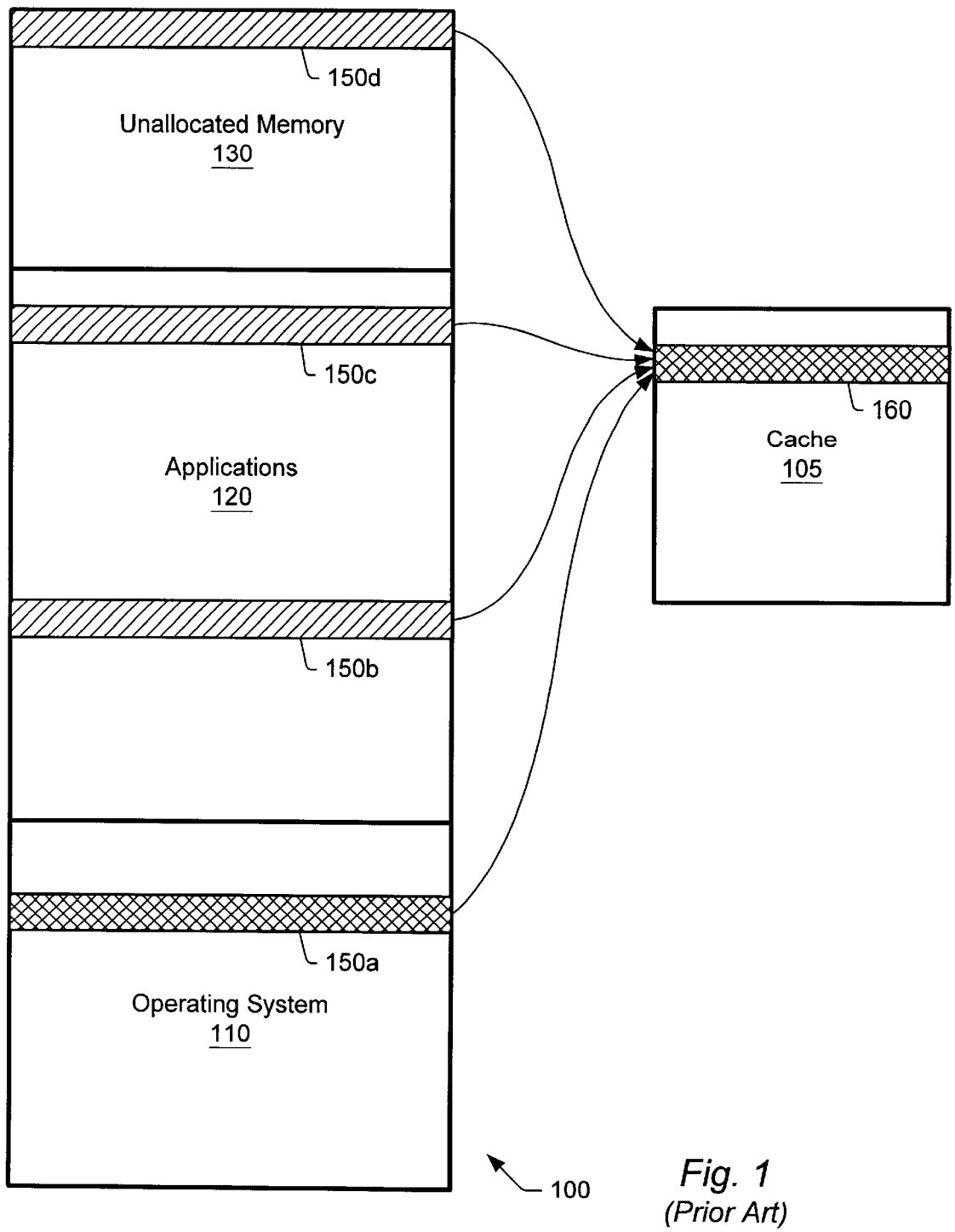
FIG. 1 illustrates a prior art a memory allocation scheme.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 2:
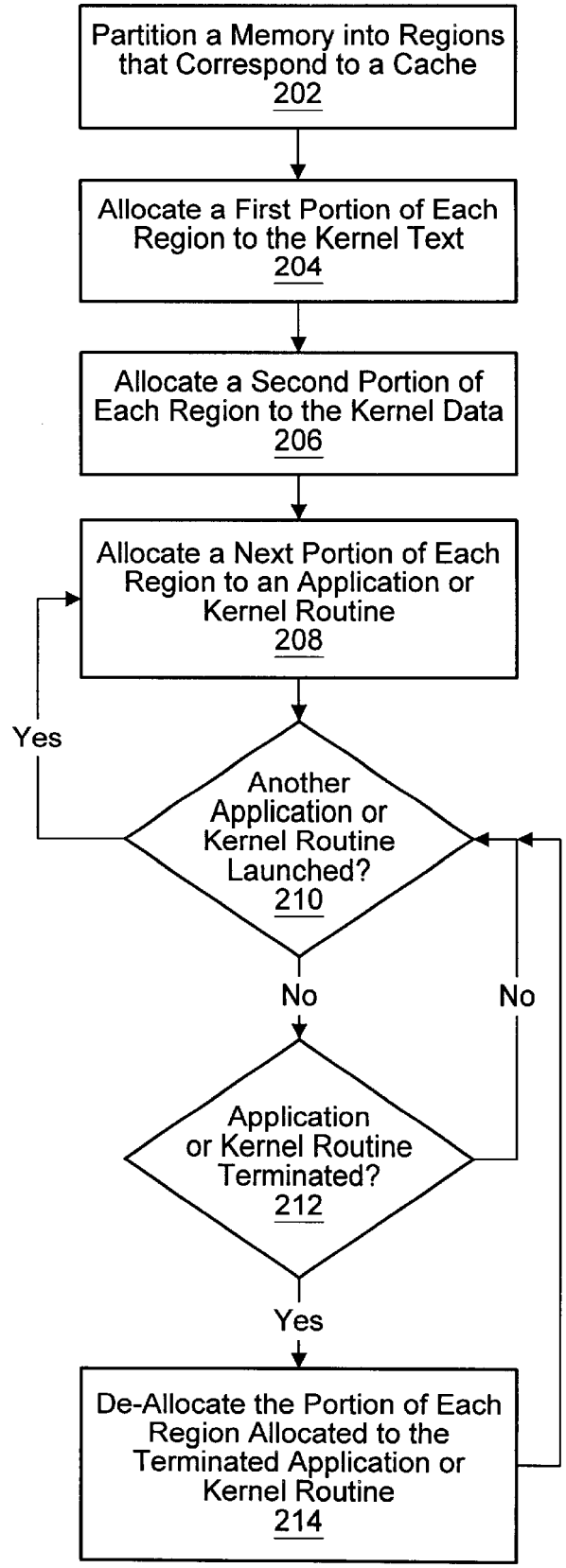
FIG. 2 is a flow chart illustrating a method for allocating memory in a cache aware manner.

Turning now to FIG. 2, a flow chart illustrating a method for allocating memory in a cache aware manner is shown. Variations on the method are possible and contemplated. Block 202 illustrates partitioning a memory into regions that correspond to a cache. Block 204 illustrates allocating a first portion of each region to the kernel text. Block 206 illustrates allocating a second portion of each region to the kernel data. Block 208 illustrates allocating a next portion of each region to an application or kernel routine. Block 210 illustrates determining whether another application or kernel routine needs to be allocated memory. If the determination is at block 210 "yes", then the chart returns to block 208. If the determination at block 210 is "no", then he chart continues to block 212. Block 212 illustrates determining whether an application or kernel routine has been terminated. If the determination at block 212 is "no", then the chart returns to block 210. If the determination at block 212 is "yes", then the chart continues at block 214. Block 214 illustrates de-allocating the portion of each region allocation to the terminated application or kernel routine. The chart then returns to block 210.

FIG. 2 illustrates a method for allocating a memory in a cache aware manner. In response to a computer system being powered up or reset, an operating system can be configured to partition a system memory into regions that correspond to a cache as noted in block 202. The operating system can then allocate corresponding portions within each region to various programs that include the operating system and applications as noted in blocks 204, 206, and 208. The portions within each region of the system memory can map into different portions of a cache as shown in more detail below in FIGS. 3, 4a, and 4b. Accordingly, cache collisions between the various programs can be avoided.

As blocks 208, 210, 212, and 214 indicate, the operating system can be configured to continuously allocate and de-allocate portions of each region of memory to programs as they are launched or terminated. In this manner, the operating system can dynamically allocate the system memory to insure that each program in memory maps to a separate region of the cache. Consequently, cache collisions between different programs can be eliminated and frequently accessed pages of a particular program stand a higher probability of residing in the cache.

In some computer systems, the operating system can include kernel text and kernel data. Block 204 indicates allocating a portion of each region of memory for the kernel text and block 206 indicates allocating a portion of each region of memory for the kernel data. In an alternative embodiment, the operating system can be allocated a portion of each region of memory for both the kernel text and kernel data.

The size of a portion of memory allocated in each region for a given program can be determined according to the needs of the program. In one embodiment, the operating system can be configured to determine the size of a program prior to allocating memory for it. The operating system can then divide the size of the program by the number of regions that it partitioned the system memory into to determine the size of the portion to allocate to the program. In an alternative embodiment, the operating system can allocate a fixed-size portion of each region of memory to a program. Other embodiments can be configured to determine the size of memory to allocate in other ways.

Figure 3:
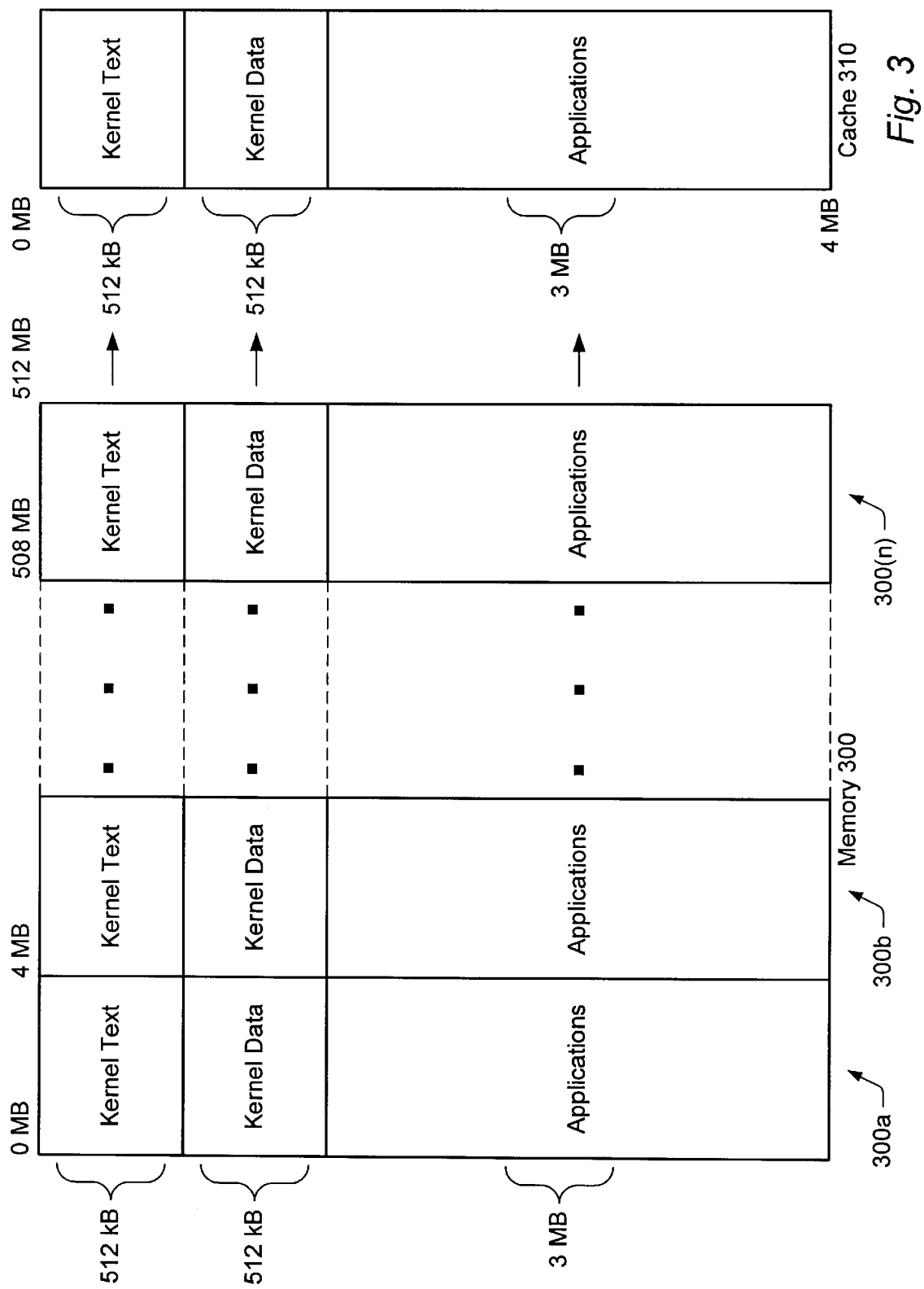
FIG. 3 illustrates one example of a cache aware memory allocation scheme.

FIG. 3 illustrates one example of a cache aware memory allocation scheme. FIG. 3 depicts memory 300 and cache 310. Memory 300 and cache 310 may comprise any suitable memory device. For example, memory 300 and cache 310 may comprise one or more RAMBUS DRAMs (RDRAMs), synchronous DRAMs (SDRAMs), static RAM, etc. It is noted that cache 310 may be part of a processing unit in the computer system, in other Words, cache 310 may be an internal cache. Alternatively, cache 310 may be an external cache memory in the computer system. In one embodiment, cache 310 may include both the internal cache and the external cache in the computer system.

As shown in FIG. 3, memory 300 can be partitioned into regions 300a through 300(n), and a portion of each region can be allocated to kernel text, kernel data, and applications as indicated. In the example shown in FIG. 3, memory 300 includes 512 megabytes of memory. Cache 310 and regions 300a through 300(n) each include 4 megabytes of storage. In other embodiments, memory 300, cache 310, and regions 300athrough 300(n) can include other storage capacities. As shown in FIG. 3, the operating system can be configured to allocate the first 512 kilobytes to kernel text, the next 512 kilobytes to kernel data, and the remaining 3 megabytes to applications within each region 300a through 300(n).

In the embodiment of FIG. 3, memory locations in each region 300a through 300(n) in memory 300 can be mapped into cache 310 according to their address. In one embodiment, memory locations can map into cache 310 according to a portion of the address of each location. In this embodiment, memory locations with the same address portion can map into the same cache location in cache 310.

In FIG. 3, regions 300a through 300(n) comprise 4 megabyte regions of memory. Accordingly, each region 300a through 300(n) begins on a 4 megabyte boundary as indicated by the addresses indicated at the top of memory 300 (0 MB, 4 MB, 508 MB, etc.). Other embodiments can include other memory sizes for each region.

FIG. 3 illustrates how memory 300 can be allocated to prevent cache conflicts between programs. Within each region 300a through 300(n), the first 512 kilobytes can be allocated to kernel text, the next 512 kilobytes can be allocated to kernel data, and the remaining 3 megabytes can be allocated to applications as shown in FIG. 3. Accordingly, the first 512 kilobytes of each region can be mapped into the first 512 kilobytes of cache 310, the next 512 kilobytes of each region can be mapped into the next 512 kilobytes of cache 310, and the remaining 3 megabytes of each region can be mapped into the remaining 3 megabytes of cache 310. As a result, the kernel text, the kernel data, and the applications all map the different regions of cache 310 and cache conflicts between the kernel text, the kernel data, and the applications can be prevented.

Cache 310 can be configured to store a tag corresponding to each cache location to identify the corresponding memory location. In one embodiment, tags stored by cache 310 can include the high order bits of the address of the memory location being stored in cache 310. Other embodiments can be configured to map memory locations into cache 310 in other ways and can store other tags.

In FIG. 3, the kernel text and kernel data can be allocated 512 kilobytes of each region and the applications can be allocated 3 megabytes of each region as shown. Other embodiments can allocate other portion sizes in each region to each program as discussed in more detail below in FIG. 4b. Also, other portions of each region can be allocated to either the kernel text or kernel data as necessary. For example, a portion of each region can be allocated in response to a 'malloc' instruction from the kernel.

Figure 4A:
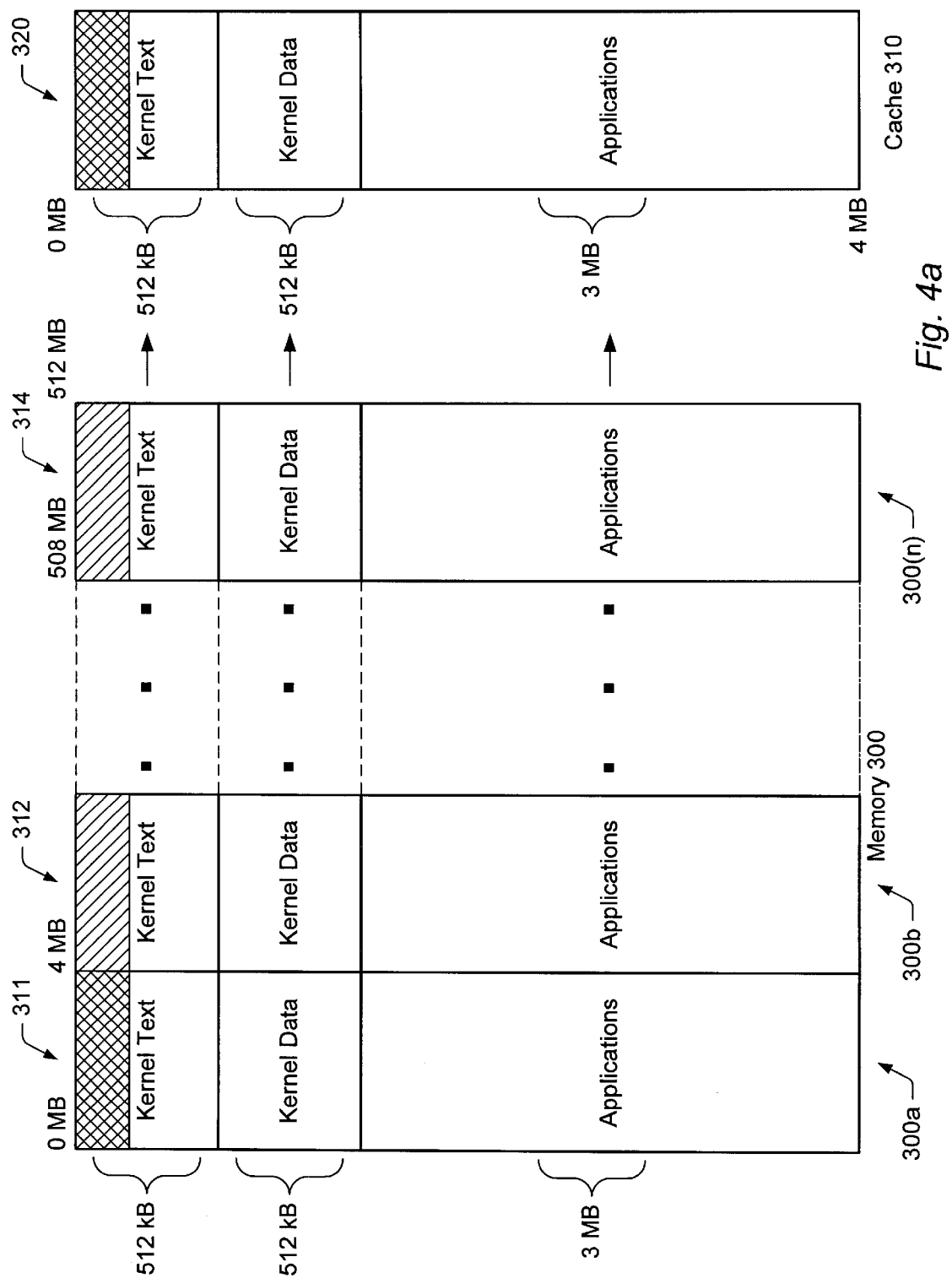
FIG. 4a illustrates a second example of a cache aware memory allocation scheme.

FIG. 4a illustrates a second example of a cache aware memory allocation scheme. FIG. 4a illustrates how a frequently accessed portion of a program can be configured to reside in cache 310. In FIG. 4a, the shaded memory locations 310, 312, and 314 all map to the shaded cache location 320. Accordingly, memory locations 310, 312, and 314 can be loaded into cache location 320 when a processor accesses them. The darker shading of memory location 310 indicates that it presently resides in cache location 320.

In FIG. 4a, memory locations 310, 312, and 314 are allocated to the kernel text. Accordingly, if the portion of the kernel text that resides in memory location 310 is accessed frequently, a higher probability exists that it will be available from cache location 320. In particular, if the portions of the kernel text that reside in memory locations 312 and 314 are accessed less frequently, the portion of the kernel text from memory location 310 will stand a higher likelihood of being accessible from cache 310.

In one particular embodiment, the kernel data includes virtual-to-physical address translation structures and the kernel text includes interrupt and trap processing code. Both the virtual-to-physical address translation structures and the interrupt and trap processing code may be accessed frequently. The allocation of memory 300 in a cache aware manner may insure that the virtual-to-physical address translation structures and the interrupt and trap processing code remain resident in cache 310 virtually all the time. Consequently, a processor can access the virtual-to-physical address translation structures and the interrupt and trap processing code from cache 310 with minimal delay.

Figure 4B:
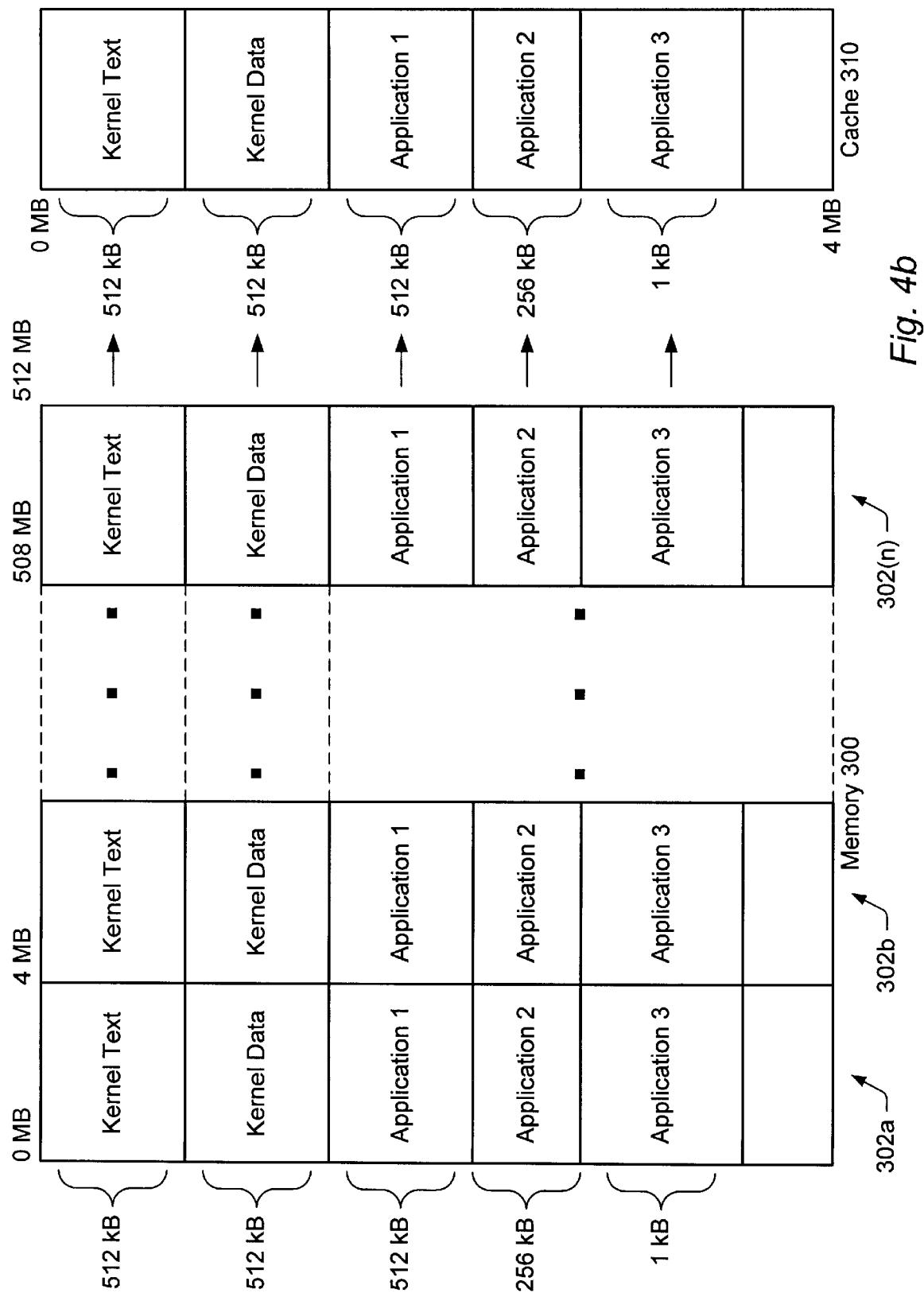
FIG. 4b illustrates a third example of a cache aware memory allocation scheme.

FIG. 4b illustrates a third example of a cache aware memory allocation scheme. FIG. 4b illustrates how a memory 300 can be allocated among an operating system and three applications in a cache aware manner. As can be seen in FIG. 4b, the first 512 kilobytes of each region 302a through 302(n) of memory 300 can be allocated to the kernel text. The second 512 kilobytes of each region can be allocated to kernel data, and the third 512 kilobytes of each region 302a through 302(n) can be allocated to application 1. In the example of FIG. 4b, application 2 may require a smaller amount of memory 300 than application 1. Accordingly, 256 kilobytes of each region 302a through 302(n) can be allocated to application 2 as shown in FIG. 4b. In contrast, application 3 may require a larger amount of memory 300 than application 1 and application 2. Thus, application 3 can be allocated 1 megabyte of each region 302a through 302(n) as shown in FIG. 4b. As further programs are launched, additional portions of each region 302a through 302(n) can be allocated to them. For example, if a fourth application is launched when memory 300 is in the state illustrated in FIG. 4, the fourth application can be allocated an unallocated portion of each region 302a through 302(n).

In response to a program terminating, the portions of each region 302a through 302(n) in memory 300 can be de-allocated. Once de-allocated, the portions of each region can be re-allocated to a later program. For example, if application 2 terminates, the 256 kilobyte portion of each region 302a through 302(n) allocated to application 2 in FIG. 4b can be de-allocated. The 256 kilobyte portion of each region 302a through 302(n) that has been de-allocated can be allocated to a program that is launched subsequent to the termination application 2.

The portions of each region 302a through 302(n) allocated to a particular program can also be subdivided as needed for a particular program. For example, the 512 kilobytes allocated to application 1 could be subdivided such that the first 256 kilobytes were allocated to the text part of application 1 and the second 256 kilobytes were allocated to the data part of application 1. The portions of each region allocated to a particular program can be subdivided in any manner to ensure that certain parts of the program remain resident in cache 310 as much as possible.

In one embodiment, an operating system can be configured to constantly re-evaluate the allocation of memory 300 and make adjustments as necessary to ensure optimal performance. For example, if the operating system determines that performance could be enhanced by allocating different size portions of each region 302a through 302(n) to each program, the operating system can be configured to de-allocate portions of each region that belong to certain programs and re-allocate other portions of each region to those programs as necessary. In this manner, the operating system can be configured to dynamically allocate memory in a cache aware manner to maximize the use of cache 310.

In one embodiment, a compiler associated with a computer system can be configured to support a cache aware memory allocation. In this embodiment, the compiler can be configured to determine the optimal memory portion size for each program and can notify the operating system. Further, the compiler can be configured to notify the operating system to subdivide the memory portion for particular parts of a program.

Figure 5:
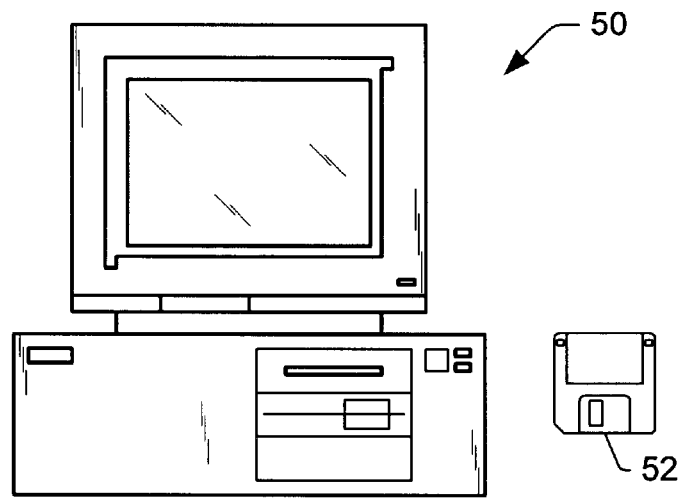
FIG. 5 illustrates one embodiment of a computer system configured to implement a cache aware memory allocation scheme.

Turning now to FIG. 5, one embodiment of a computer system 50 comprising an operating system configured to implement a cache aware memory allocation scheme as described above, and a storage medium 52 containing the memory management software embodying the code to implement the cache aware memory allocation scheme are shown. The storage medium 52 may take any of the various forms, such as a floppy disk, an optical disk, a magnetic tape, a compact disk, a video disk, etc. The storage device 52 may be external to the computer system 50, or it may be built into the computer system 50. The storage medium can be within another computer system 72 (FIG. 7) that transmits the operating system including the memory management software or simply the memory management software to the receiver computer system, e.g., one or more of the computer systems 74, 76 and 78 in FIG. 7, via a communication network as illustrated in FIG. 7.

Figure 6:
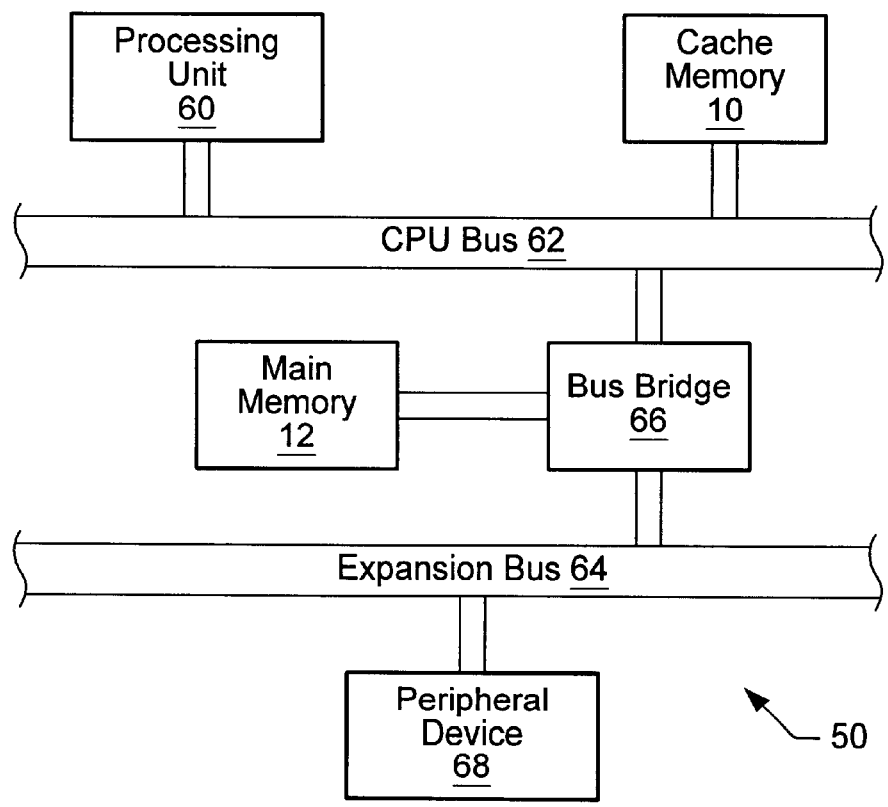
FIG. 6 illustrates an exemplary hardware configuration of the computer system in FIG. 5.

FIG. 6 illustrates an exemplary hardware configuration of the computer system 50. The computer system 50 may comprise a processing unit 60 coupled to an external cache memory 10 via a high-speed CPU bus 62. The processing unit 60 may include one or more of the commercially available processing units, e.g., the Intel x86 family of processors, the Sun SPARC family of processors, etc. As previously described, the cache memory 10 may be internal to the processing unit 60. The system memory 12 is shown coupled to the processing unit 60 via a bus bridge 66. In an alternative embodiment, the physical bus bridge 66 that routes digital signals among various system devices may be absent. Finally, one or more peripheral devices 68 may be coupled to the processing unit 60 via one or more expansion buses 64. Some examples of an expansion bus 64 include a PCI (Peripheral Component Interconnect) bus, an ISA (Industry Standard Architecture) bus, an MCA (Micro Channel Architecture) bus, a USB (Universal Serial Bus) bus, a SCSI (Small Computer System Interface) bus, a Fiber Channel, etc. The peripheral device 68 may be external to the physical unit embodying various other devices of the computer system 50. The peripheral device 68 may include one or more of the following: a hard disk drive, a video monitor, a storage array, a compact disk drive, a floppy disk drive, a keyboard, etc.

The complete operating system may reside in the peripheral device 68, and only a portion of the operating system routines may be loaded into the system memory 12. In one embodiment, the storage device 52 may supply necessary memory management software routines to the operating system, which, in turn, may load that software into the system memory 12 during system initialization or at runtime.

Figure 7:
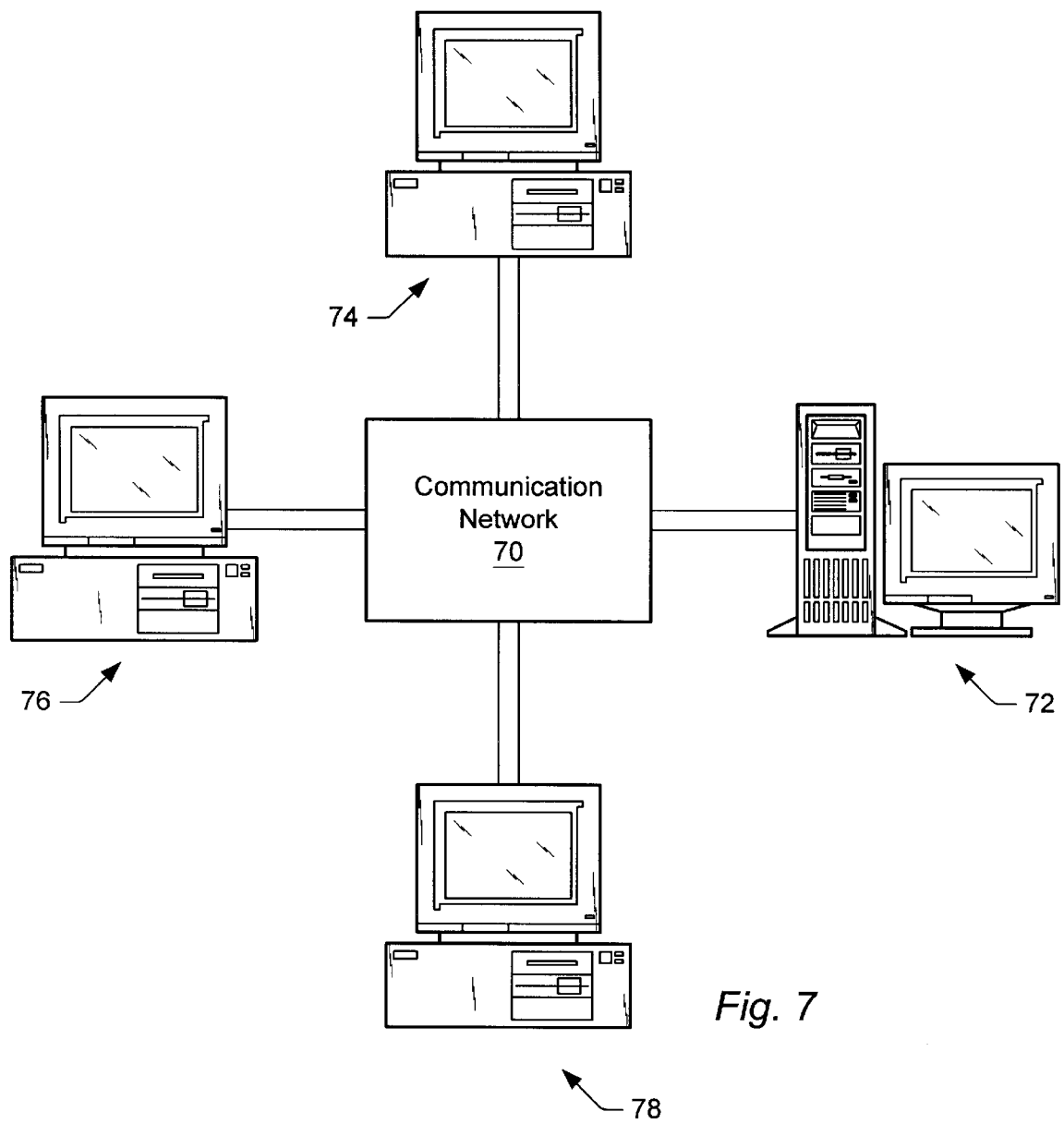
FIG. 7 illustrates one embodiment of a communication network configured to implement a cache aware memory allocation scheme.

Turning now to FIG. 7, one embodiment of a communication network configured to implement a cache aware memory allocation scheme is illustrated. As described before, the computer system 72 may transmit the necessary operating system (with memory management software) routines or simply the memory management software routines to one or more computer systems (74, 76, and 78) connected to it via a communication network 70. The communication network, for example, may be a local area network (LAN), a wide area network (WAN), the Internet, a wireless communication network (including satellite communication), or any other data communication mechanism.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but on the contrary, the intention is to cover all such modifications, equivalents and alternatives as may fall within the spirit and scope of the present invention as defined by the appended claims.

I claim:

1. A computer system comprising:

a processing unit;

a system memory coupled to said processing unit;

a cache memory coupled to said processing unit and said system memory; and an operating system to manage execution of a plurality of applications using said processing unit, said system memory, and said cache memory;
wherein said operating system is configured to partition said system memory into a plurality of regions, and wherein said operating system is configured to partition each of said plurality of regions into a first portion which maps to a first location of said cache memory, and a second portion which maps to a second location of said cache memory, and wherein said operating system is configured to designate memory locations corresponding to said first portions for storage of a first type of data, and memory locations corresponding to said second portions for storage of a second type of data.

2. The computer system of claim 1, wherein said first type of data is data corresponding to said operating system.

3. The system of claim 2, wherein said first portions comprise a first sub-portion which maps to a first portion of said first location of said cache memory, and a second sub-portion which maps to a second portion of said first location of said cache memory, and wherein said operating system is configured to designate said first sub-portion for storage of kernel text of said operating system, and said second sub-portion for storage of kernel data of said operating system.

4. The computer system of claim 1, wherein said operating system is configured to prevent a portion of said first portion of said cache memory from being updated.

5. The computer system of claim 1, wherein in response to detecting a first program corresponds to said first type of data, said operating system is configured to allocate memory locations corresponding to said first portions to said first program, and wherein in response to detecting a second program corresponds to said second type of data, said operating system in configured to allocate memory locations corresponding to said second portions to said second program.

6. The computer system of claim 5, wherein said second program is an application program.

7. A computer system comprising:

a processing unit;

a system memory coupled to said processing unit;

a cache memory coupled to said processing unit and said system memory; and an operating system to manage execution of a plurality of applications using said processing unit, said system memory, and said cache memory;

wherein said operating system is configured to partition said system memory into a plurality of regions, wherein said operating system is configured to allocate a first portion of each of said plurality of regions to a first program, wherein said operating system is configured to allocate a second portion of each of said plurality of regions to a second program, wherein said first portion of each of said plurality of regions maps to a first portion of said cache memory, and wherein said second portion of each of said plurality of regions maps to second portion of said cache memory.

8. The computer system of claim 7, wherein said first program corresponds to said operating system, and wherein said second program corresponds to an application program.

9. The computer system of claim 7, wherein said operating system is configured to allocate a third portion of each of said plurality of regions to a set of data values corresponding to said first program, and wherein said third portion of each of said plurality of regions maps to a third portion of said cache memory.

10. The computer system of claim 7, wherein each of said plurality of regions and said cache memory correspond to a first size.

11. The computer system of claim 7, wherein said first portion of each of said plurality of regions corresponds to a first size, and wherein said second portion of each of said plurality of regions corresponds to a second size.

12. The computer system of claim 11, wherein said first size differs from said second size.

13. The computer system of claim 7, wherein said operating system is configured to prevent replacement of a one or more pages in said first portion of said cache memory.

14. A method comprising:

partitioning a system memory into a plurality of regions;

allocating a first portion of each of said plurality of regions to a first program; and allocating a second portion of each of said plurality of regions to a second program;

wherein said first portion of each of said plurality of regions maps to a first portion of a cache memory, and wherein said second portion of each of said plurality of regions maps to second portion of said cache memory.

15. The method of claim 14, further comprising:

allocating a third portion of each of said plurality of regions to a set of data values corresponding to said first program;

wherein said third portion of each of said plurality of regions maps to a third portion of said cache memory.

16. The method of claim 14, wherein each of said plurality of regions and said cache memory correspond to a first size.

17. The method of claim 14, further comprising:

preventing replacement of one or more pages in said first portion of said cache memory.

18. A method of allocating a system memory comprising:

partitioning a system memory into a plurality of regions;

partitioning each of said plurality of regions into a first portion which maps to a first location of a cache memory, and a second portion which maps to a second location of said cache memory;

designating memory locations corresponding to said first portions for storage of a first type of data; and designating memory locations corresponding to said second portions for storage of a second type of data.

19. The method of claim 18, further comprising:

allocating memory locations corresponding to said first portions to a first program, in response to detecting said first program corresponds to said first type of data.

20. The method of claim 19, further comprising:

preventing a plurality of locations of said second portion of said cache memory from being updated.

21. The method of claim 19 further comprising:

allocating memory locations corresponding to said second portions to a second program in response to detecting said second program corresponds to said second type of data.

22. The method of claim 21, wherein said first type of data corresponds to said operating system.

23. The method of claim 18, further comprising:

preventing a plurality of locations of said first portion of said cache memory from being updated.

* * * * *